United States Patent
Brandolese et al.

(10) Patent No.: US 12,551,861 B2
(45) Date of Patent: Feb. 17, 2026

(54) APPARATUS FOR TREATING MATERIALS WITH PLASMA

(71) Applicant: DIRECTA PLUS S.P.A., Lomazzo (IT)

(72) Inventors: Flavio Brandolese, Milan (IT); Giulio Giuseppe Cesareo, Como (IT); Laura Giorgia Rizzi, Saronno (IT)

(73) Assignee: Directa Plus S.p.A., Lomazzo (IT)

( * ) Notice: Subject to any disclaimer, the term of this patent is extended or adjusted under 35 U.S.C. 154(b) by 1226 days.

(21) Appl. No.: 17/298,110

(22) PCT Filed: Dec. 18, 2019

(86) PCT No.: PCT/EP2019/086067
§ 371 (c)(1),
(2) Date: May 28, 2021

(87) PCT Pub. No.: WO2020/127565
PCT Pub. Date: Jun. 25, 2020

(65) Prior Publication Data
US 2022/0040665 A1    Feb. 10, 2022

(30) Foreign Application Priority Data
Dec. 19, 2018 (IT) .................. 102018000020206

(51) Int. Cl.
*B01J 19/12* (2006.01)
*C01B 32/225* (2017.01)
*H05H 1/30* (2006.01)

(52) U.S. Cl.
CPC ........... *B01J 19/126* (2013.01); *C01B 32/225* (2017.08); *H05H 1/30* (2013.01);
(Continued)

(58) Field of Classification Search
CPC .............. B01J 19/126; B01J 2219/0898; B01J 2219/1227; B01J 2219/1269;
(Continued)

(56) References Cited

U.S. PATENT DOCUMENTS

| | | | | |
|---|---|---|---|---|
| 4,266,113 A | * | 5/1981 | Denton | B23K 10/00 219/121.36 |
| 2005/0163696 A1 | | 7/2005 | Uhm et al. | |

(Continued)

FOREIGN PATENT DOCUMENTS

| | | |
|---|---|---|
| CN | 106507573 A | 3/2017 |
| WO | 200204930 A1 | 1/2002 |
| WO | 2003069964 A1 | 8/2003 |

OTHER PUBLICATIONS

International Searching Authority: International Search Report for corresponding International Patent Application No. PCT/EP2019/086067 dated Mar. 18, 2020, 4 pages.

*Primary Examiner* — Xiuyu Tai
(74) *Attorney, Agent, or Firm* — Patterson Intellectual Property Law, PC

(57) ABSTRACT

Apparatus for treating materials with plasma, comprising a microwave generator (15), a waveguide (20) and a tubular torch (30), comprising three coaxial tubes (33, 35, 37) and a central section (30.2) connected to the waveguide (20) by means of a body (50) having a cavity (52) through which the tubes pass. A plasma containment chamber is defined in the outer tube (35) at the cavity (52) of the body (50).

18 Claims, 5 Drawing Sheets

(52) U.S. Cl.
CPC .............. *B01J 2219/0898* (2013.01); *B01J 2219/1227* (2013.01); *B01J 2219/1269* (2013.01)

(58) Field of Classification Search
CPC ...... C01B 32/225; H05H 1/30; H05H 1/0031; H05H 1/3405; H05H 1/26; H05H 1/42; H05H 1/46; H05H 1/461; H05H 1/4622; G01J 3/443; G01N 21/73; G01N 22/00; G01N 33/18; H01J 1/28; H01J 49/105
See application file for complete search history.

(56) References Cited

U.S. PATENT DOCUMENTS

| | | |
|---|---|---|
| 2007/0175871 A1 | 8/2007 | Brezni et al. |
| 2008/0173641 A1 | 7/2008 | Hadidi et al. |
| 2013/0270261 A1 | 10/2013 | Hadidi et al. |
| 2014/0342093 A1 | 11/2014 | Hadidi et al. |

* cited by examiner

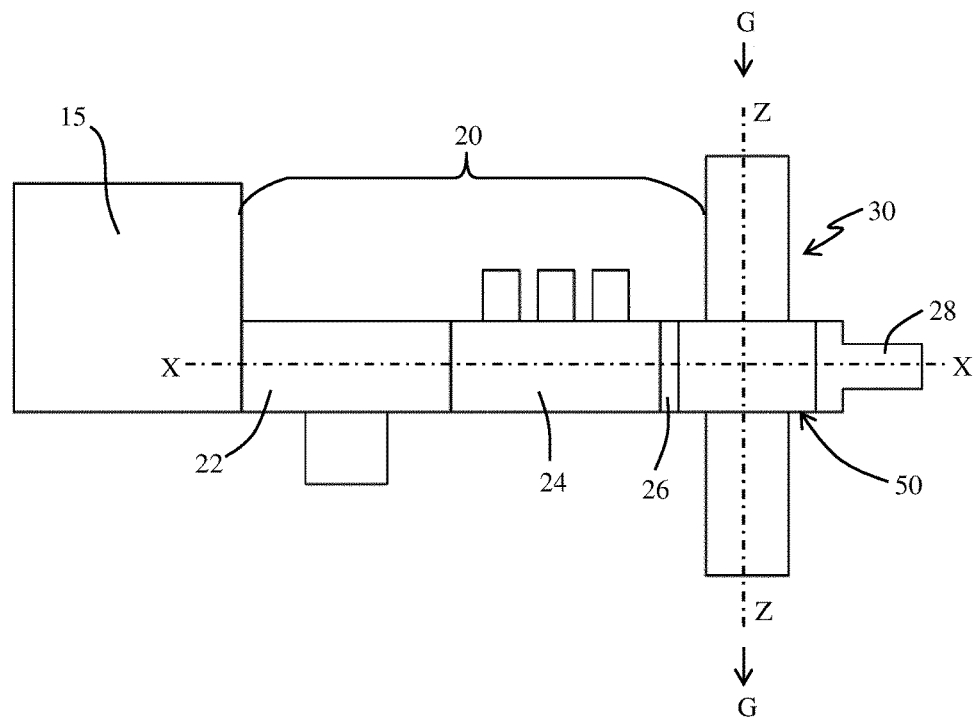
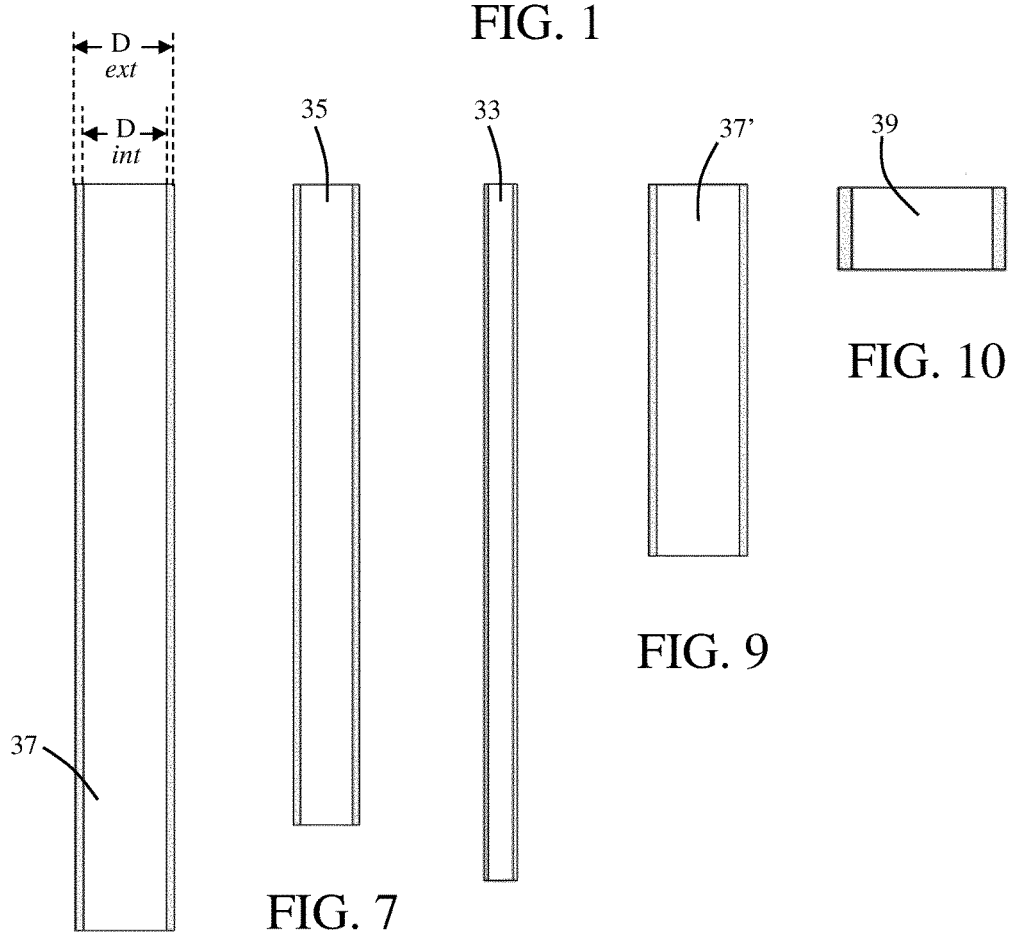
FIG. 1
FIG. 6  FIG. 7  FIG. 8  FIG. 9  FIG. 10

APPARATUS FOR TREATING MATERIALS WITH PLASMA

FIELD OF THE INVENTION

The present invention relates to an apparatus for treating materials with plasma. In particular, the present invention relates to an apparatus comprising a torch for microwave systems, suitable to generate and sustain atmospheric thermal plasma for treating powder materials.

Although the apparatus can be advantageously used for treating intercalated graphite, it is not limited to this use.

PRIOR ART

Intercalated graphite, or expandable graphite, is a material used industrially as intumescent or, after having been expanded, as base for producing flexible graphite gaskets or for producing graphene through various techniques.

Expansion of the intercalated graphite takes place by rapidly heating the graphite, so that the molecules of intercalating agent, such as sulfuric acid, can evaporate rapidly.

The most widely used industrial technique is that of heating in the furnace, a simple and relatively inexpensive system. In this case the hot air and/or the hot walls of the receptacle and/or an induction system heat the graphite, which consequently expands. However, unless mixing is optimal, the portion of graphite farthest from the walls is exposed to less heat and therefore the expandability of the initial product is not optimally exploited.

Another possible production technique of expanded graphite consists in heating the graphite directly with microwaves, without plasma. In this case, the treatment is efficacious and heats the material rapidly. However, the microwaves are only able to penetrate for a few millimeters and therefore the layer of graphite to be treated must be thin. Moreover, subjecting a combustible and conductive material such as graphite to microwaves in the presence of oxygen causes the formation of numerous small electric arcs between the particles of material. Such arcs give rise to the formation of regions of oxidized material which are not desirable as they represent defects in the crystalline lattice. These regions can be observed under the electron microscope in the arc discharge points.

Performing the operation in an inert atmosphere, such as under nitrogen or under argon, means generating a plasma, but in a disorderly manner and without protecting the walls of the receptacle, and therefore the technique poses significant complications for use in industrial production.

Systems for treating powder materials with thermal plasma, i.e., with high temperature plasma as they operate more or less at atmospheric pressure, are not widely used, and those in which the plasma is sustained by microwaves are even less frequently used.

There are known methods and apparatus that use thermal plasma not generated by microwaves, such as induction systems, also called ICP (Inductively Coupled Plasma").

In these systems, the electromagnetic field that sustains the plasma is generated by a metal loop through which alternating current passes at a defined frequency, greater than 10 MHz.

These systems are typically used in the ICP-MS (Mass Spectrometer) and ICP-OES (Optical Emission Spectrometer) laboratory instruments of many manufacturers. In these systems plasma is used to vaporize the sample, introduced axially into the heart of the plasma, to detect the atomic composition thereof according to the weight of the component species, or based on the emission spectrum. These are generally apparatus with a power of 1-1.5 kW.

Another field of application of ICP systems are machines for treating materials, for example machines for spheroidizing metal powders, obtaining synthetic materials from various precursors, or also for metal deposition.

An example of ICP torch operating at a power of 65-100 kW is described in U.S. Pat. No. 10,028,368 B2.

ICP generators designed for analysis apparatus are usually not sufficiently sturdy to operate reliably in a continuous manner when treating intercalated graphite. This is due to the fact that in ICP systems the plasma is part of the high frequency circuit that generates it, and analysis machines are not conceived to receive significant perturbations, which instead occurs by making the graphite—which is a conductive material—pass through the plasma.

Therefore, there is a shortage of ICP generators with power comprised between 1 and 10 kW on the market, while machines with higher powers, such as the machine described in U.S. Pat. No. 10,028,368 B2, are available.

Unlike ICP plasma systems, systems with plasma generated by microwaves—also called MIP ("Microwave Induced Plasma") are very widely available, also in the field of powers greater than 1 kW but less than 10 kW. These MIP systems are interesting also due to the fact that the devices that generate and use the microwaves are completely separate. This prevents malfunctioning of the torch from having repercussions on the microwave generation system. CN 106507573 A and CN 107064114 A describe microwave generated plasma torches consisting of three coaxial tubes that can be assembled and disassembled separately. In both cases these are MIP torches for use in analysis instruments, not for apparatus targeted at industrial use.

US 2013/0270261 A1 discloses a microwave plasma torch generating laminar flow for materials processing, comprising three staggered tubes fused together at one end, and gas injection ports which are angled relative to the central axis of the torch.

WO 02/04930 A1 and WO 03/069964 A1 disclose plasma sources for spectrometry, in which the plasma torch is axially aligned with the magnetic field of the microwaves.

WO 03/069964 A1 discloses a microwave plasma source for spectrometry, in which the plasma torch is axially aligned with the magnetic field of the microwaves.

US 2014/0342093 A1 discloses a method of processing materials using a microwave plasma torch similar to that of US 2013/0270261 A1.

US 2005/0163696 A1 discloses a synthesis method and apparatus for carbon nanotubes using a microwave plasma torch.

With regard to the process for treating powder materials, in particular for treating intercalated graphite with atmospheric thermal plasma, EP2038209 B1 describes the treatment of intercalated graphite at a temperature of at least 1300° C. by means of passage through an inert gas plasma or in an electric arc.

An object of the present invention is therefore to provide an MIP type apparatus for treating materials with atmospheric thermal plasma, in particular for treating powder materials.

Another object of the invention is to provide an MIP type apparatus for treating materials with atmospheric thermal plasma suitable to operate at a power between 1 and 10 kW, or more, and to use microwave generators of any frequency, in particular an apparatus that allows the use of microwave generators at 2450 MHz and 915 MHz, which are the two most widely systems used in the field.

A further object of the invention is to provide an apparatus for treating materials with atmospheric thermal plasma which can be produced with components that do not require very high precision machining operations and compliance with very strict dimensional tolerances, i.e., an apparatus that can be constructed with industrial grade components.

Another further object of the invention is to provide an apparatus for treating materials with atmospheric thermal plasma in which the apparatus has a modular structure and components that can be easily assembled and disassembled in order to be individually checked and replaced, if necessary.

SUMMARY OF THE INVENTION

Therefore, an aspect of the invention relates to an apparatus for treating materials with plasma, comprising a microwave generator, a waveguide and a tubular torch comprising an upstream section, a central section, a downstream section and at least an inner tube, an intermediate tube and an outer tube arranged coaxially, each having an upstream end and a downstream end, with said outer tube extending from said upstream section at least up to said central section of said torch and defines a plasma containment chamber in said central section of the torch; characterized in that:
the longitudinal axis of said torch is aligned with the electric field operatively generated in said waveguide;
said inner tube, said intermediate tube and said outer tube of said torch are removably mounted at their upstream ends by means of fixing and centering means in said upstream section of said torch;
said waveguide is connected to said microwave generator and to a hollow body of said central section of the torch, said hollow body having a cavity in which there are defined an upstream side and a downstream side, each provided with a circular hole for housing said outer tube of the torch, said plasma containment chamber being defined in the outer tube;
the downstream end of said intermediate tube is aligned with said upstream side of said cavity of said hollow body, or extends for a distance beyond said upstream side of said cavity;
the downstream end of said inner tube is aligned with the downstream end of said intermediate tube, or is arranged upstream of the downstream end of said intermediate tube;
said downstream section of said torch comprises a secondary treatment zone defined in said outer tube downstream of said plasma containment chamber, ending with an exhaust opening,
whereby said material to be treated is operatively introduced into said inner tube and said plasma is formed in said plasma containment chamber by a gas introduced into said intermediate tube and subjected to the electromagnetic field generated by said microwaves.

In the present description, the terms "upstream" and "downstream" refer to the direction of flow of the material that is introduced into the microwave torch.

DESCRIPTION OF FIGURES

The invention is described below with reference to the accompanying figures, provided by way of non-limiting example, wherein:
FIG. 1 is a schematic view of the main components of the apparatus according to the invention;
FIGS. 6-10 are sectional views of components of the torch of FIG. 4.

DETAILED DESCRIPTION

Figure 2:
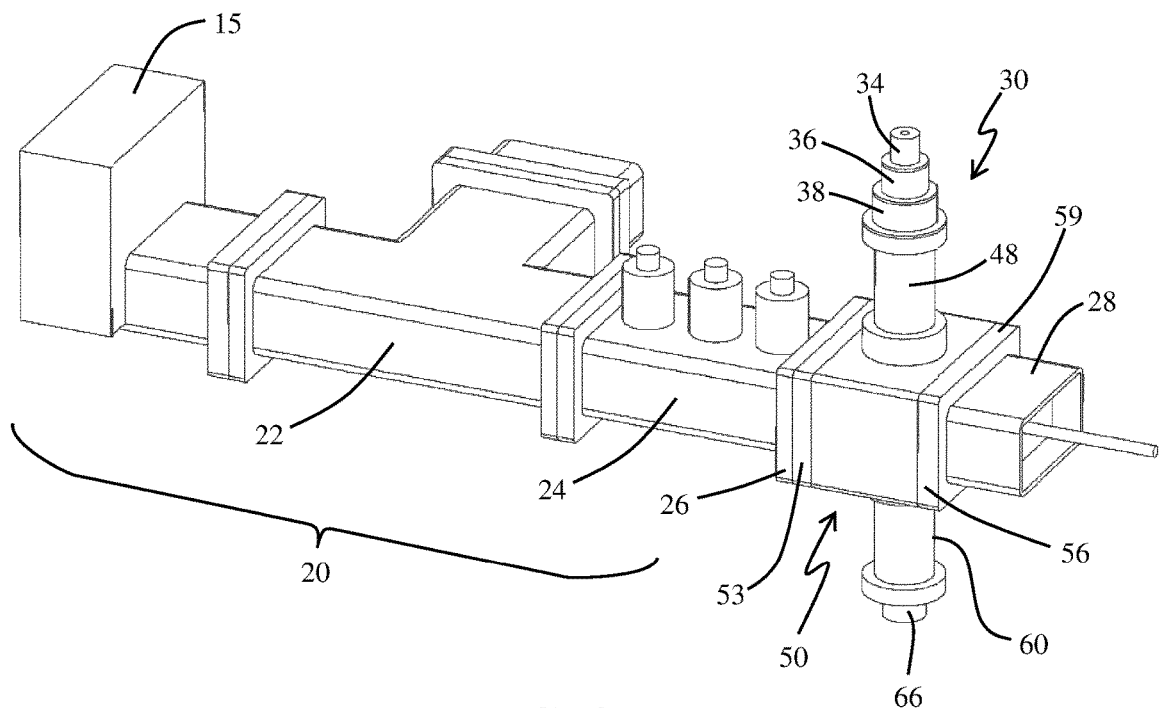
FIG. 2 is a schematic perspective view of the apparatus of FIG. 1.
Figure 3:
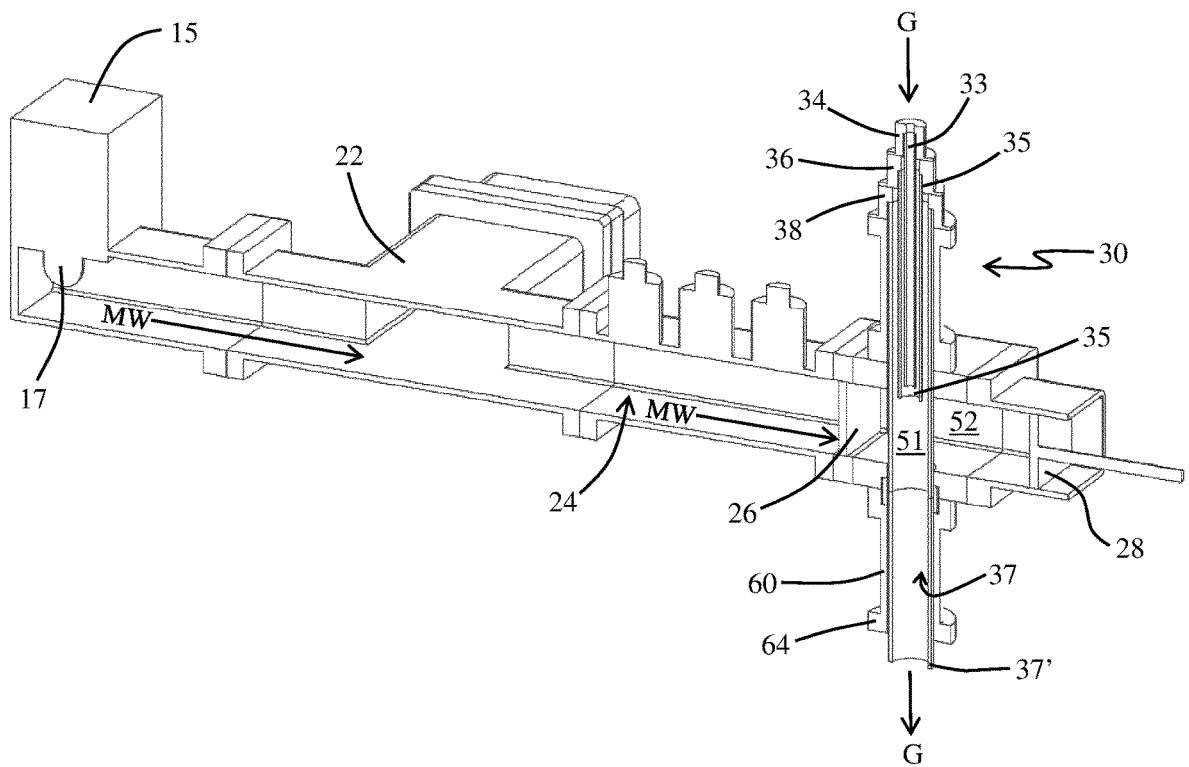
FIG. 3 is a sectional schematic perspective view of the apparatus of FIG. 1.

With reference to FIGS. 1-3, the apparatus according to the invention comprises a microwave generator 15, a waveguide 20, a window 26 in material transparent to microwaves, a microwave plasma torch 30 and a short circuit terminal 28.

The waveguide 20 comprises a passive load isolator 22 and an impedance matching device 24 of the circuit, as is known in the art.

Although in an embodiment the device 15 generates microwaves at the frequency of 915 MHz, generators with different frequencies, such as the frequency of 2450 MHz, can also be used. In FIG. 3 the number 17 indicates the antenna of the magnetron, i.e., the high-powered vacuum tube that generates and amplifies the microwaves, as is known in the art.

For the purpose of the present invention, the range of interest for the frequency of the microwave is from 400 to 6,000 MHz. Although in the embodiment described the waveguide is of rectangular type, it is also possible to use other forms of waveguide, as long as it is possible to align the longitudinal axis of the torch with the electric field. Although in the embodiment described the microwave source is a magnetron, other generation devices are known in the art, such as solid-state microwave generators, which can be used as drop-in replacements without altering the essence of the invention.

The passive load isolator 22 has the function of diverting and dissipating the reflected power, i.e., not absorbed by the torch 30, as is known in the art.

The impedance matching device 24 of the circuit, for example a 3-stub tuner, has the function of reducing the level of the reflected power in the microwave apparatus, as is known in the art.

The window 26 in material transparent to microwaves, for example quartz or another suitable material, has the function of mechanically separating the zone of the generator from the zone of the torch 30, to prevent the conductive powders from entering the waveguide 20 and causing electric arcing in proximity of the antenna of the generator 15, as is known in the art.

The torch 30, also called microwave applicator, has a structure that will be described in detail below. The torch is the component in which, simultaneously, the plasma is maintained thanks to correct balancing of power, gas flows and their structure and the material to be treated is subjected to rapid and intense heating, so as to exploit its expandability potential to a maximum.

The short circuit terminal 28 can be fixed or sliding, and performs the function of correctly positioning the peak of the standing wave that forms, with respect to the axis Z of the torch, i.e., so that the superimposition of the forward wave and of the reflected wave is at its maximum in the area of the axis of the torch 30.

The torch 30 is arranged perpendicularly to the waveguide 20, i.e., the longitudinal axis Z of the torch 30 is perpendicular to the longitudinal axis X of the waveguide 20 (FIG. 1).

Microwaves are propagated in the waveguide 20 in the transverse electric mode, $TE_{10}$. With this arrangement, the longitudinal axis Z of the torch 30 is aligned with, i.e. parallel to, the electric field operatively generated in the waveguide 20. Furthermore, the longitudinal axis Z of the torch 30 coincides with a maximum of the electric field.

With reference to FIGS. 1-3, the microwaves travel through the waveguide 20, as indicated by the arrows MW, from the generator 15 to the torch 30. The material to be treated, for example graphite, is introduced into the torch 30 from above together with the injection gas and discharged after treatment from below, according to a flow indicated by the arrows G. The direction of the arrows G defines the upstream and downstream parts of the torch 30.

Upstream of the torch 30 a system—not illustrated—for transferring and dosing the material to be treated allows the material—for example intercalated graphite—to be introduced into the torch without pulsations, so as to guarantee uniform treatment of this material during passage through the plasma.

Downstream of the torch 30 is a system—also not illustrated—for conveying fumes and the treated material. This system is structured differently according to whether the material is to be collected dry, in which case it will be an interface toward the final handling system, such as a screw conveyor, or in liquid, in which case it will be a receptacle in which gas separation and mixing of the material in liquid take place.

Figure 4:
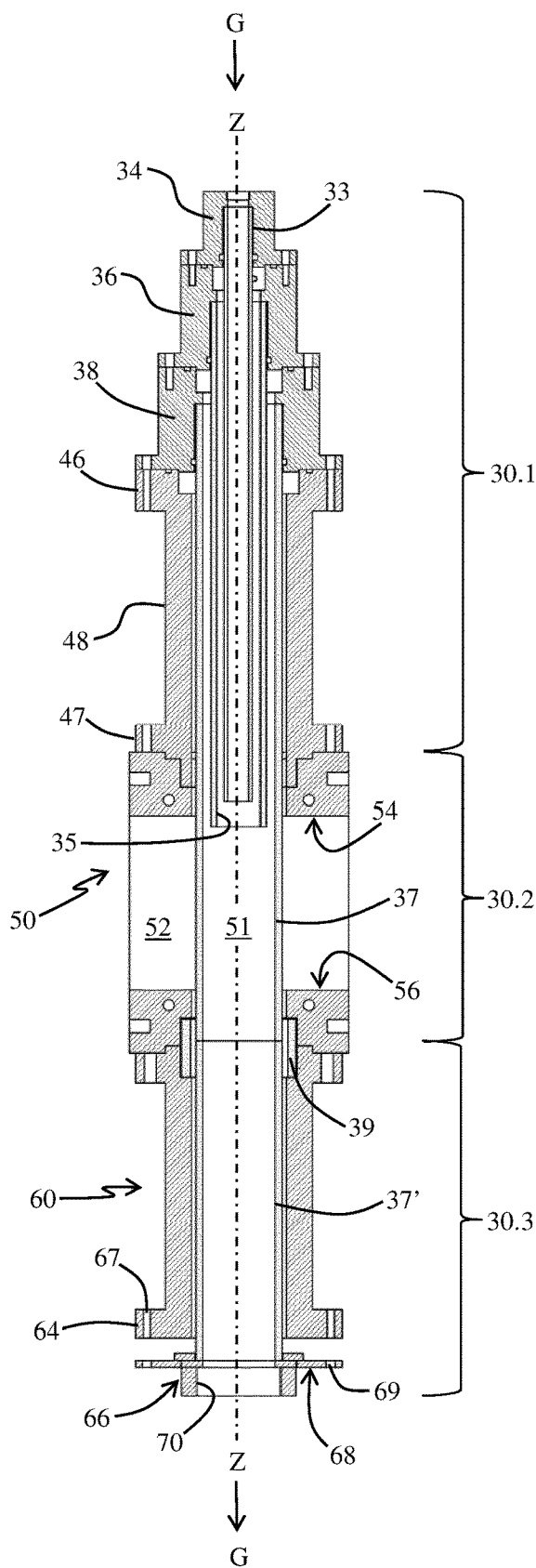
FIG. 4 is a sectional view in vertical elevation of an embodiment of the torch belonging to the apparatus according to the invention.

With reference also to FIG. 4, the torch 30 is a tubular device consisting of an assembly of mechanical components made of metal and ceramic material, produced and assembled so as to have an upstream section 30.1, a central section 30.2 and a downstream section 30.3, where the terms "upstream" and "downstream" refer to the direction of flow of the material that is introduced into the microwave torch according to the arrows G.

The upstream section 30.1, the central section 30.2 and the downstream section 30.3 are removably connected to each other by fastening means.

The tubular torch 30 further comprises an inner tube 33, an intermediate tube 35 and an outer tube 37, each having an upstream end and a downstream end. The tubes 33, 35 and 37 are mounted coaxially with their upstream end thanks to fixing and centering means.

The fixing and centering means comprise a tube clamp 34 for the inner tube 33, a tube clamp 36 for the intermediate tube 35 and a tube clamp 38 for the outer tube 37, all arranged in the upstream section 30.1 of the torch.

Each tube clamp is provided at its base with a flange for mounting on the tube clamp below by means of screws (not illustrated) fixed in through holes made on the flanges and in corresponding holes of the tube clamp below, suitably threaded. Therefore the tube clamp 34 is fixed to the tube clamp 36 by means of screws engaged in the holes 40 and 41, the tube clamp 36 is fixed to the tube clamp 38 by means of screws engaged in the holes 42 and 43, and the tube clamp 38 is fixed at its base to a hollow cylindrical spacer 48 by means of screws engaged in holes 44 of the tube clamp and corresponding holes 45 made on an upper flange 46 of the spacer 48.

Figure 5:
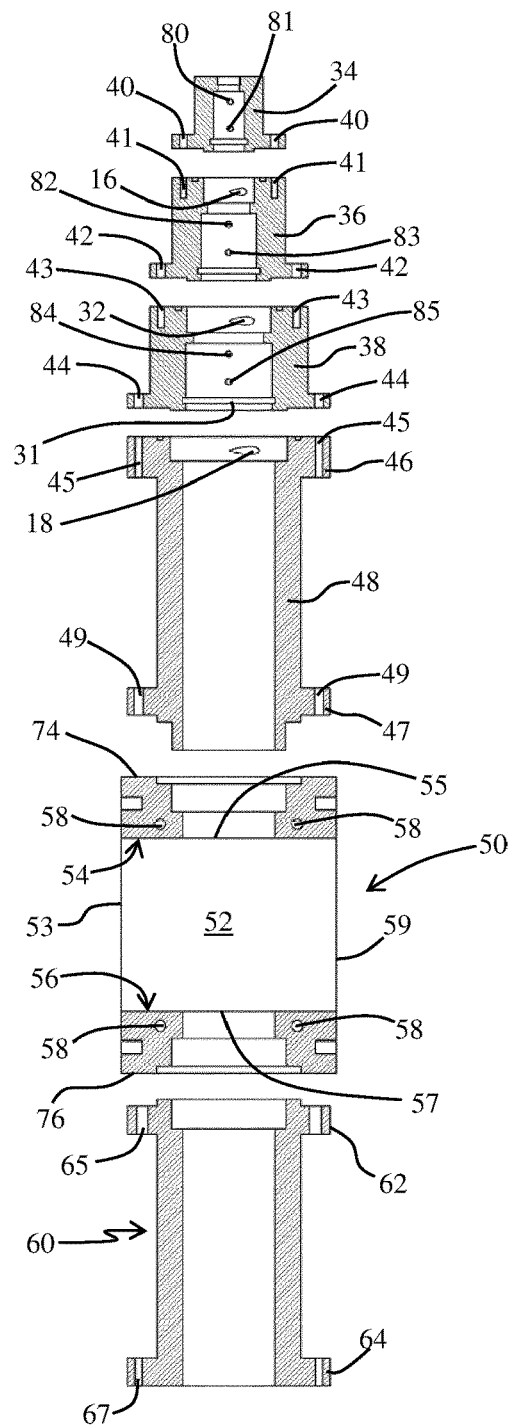
FIG. 5 is an exploded view of some components of the torch of FIG. 4.

Each tube clamp 34, 36 and 38 is also provided with threaded holes perpendicular to the longitudinal axis Z of the torch, spaced about 120° from each other. More particularly, each tube clamp is provided with two arrays of such spaced, threaded holes. With reference to FIG. 5, these double arrays of holes are designated as 80, 81 for tube clamp 34, as 82, 83 for tube clamp 36, and as 84, 85 for tube clamp 38.

Figure 12:
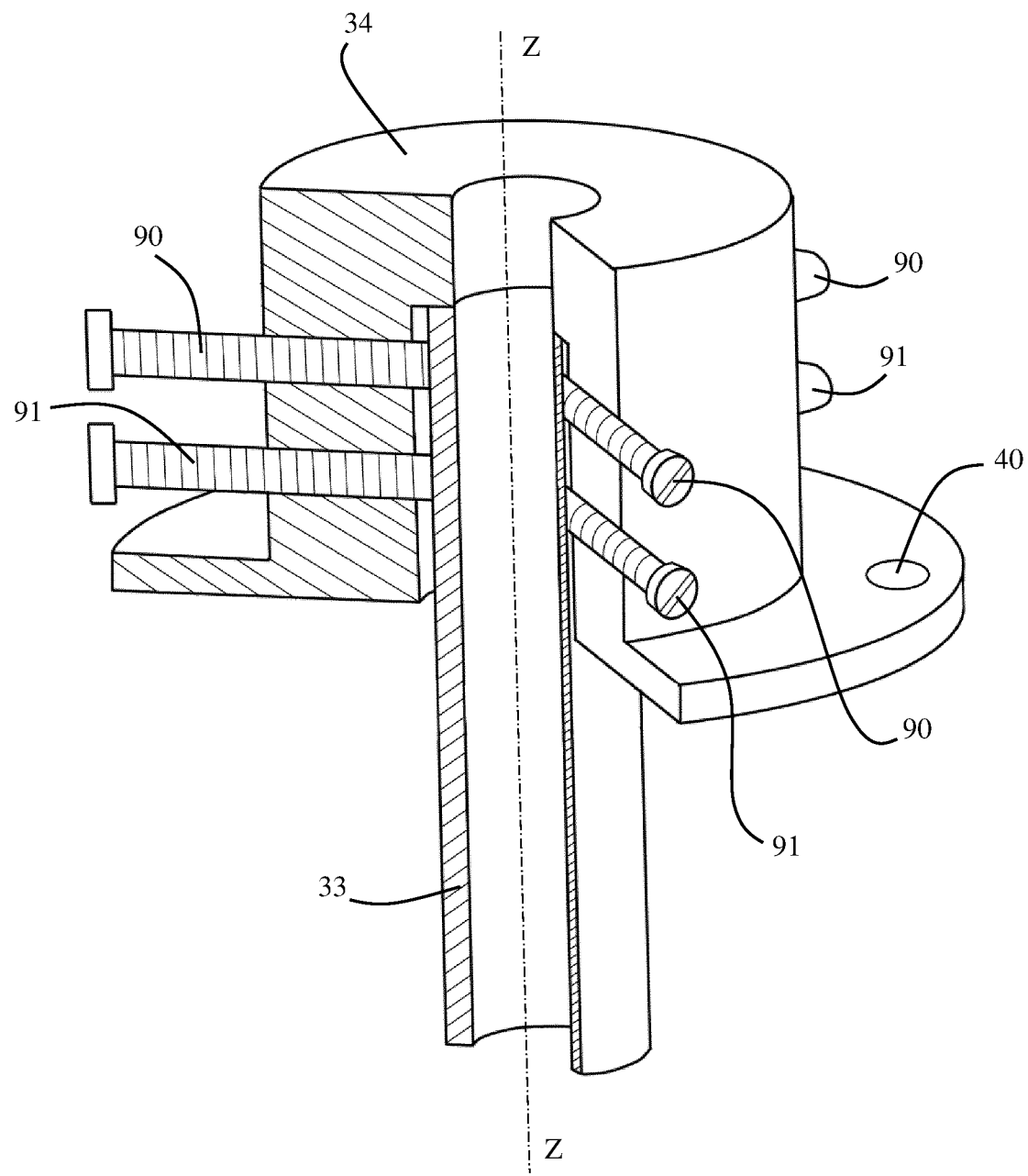
FIG. 12 is a schematic perspective view of a part of the torch of FIG. 4.

These threaded holes perpendicular to the longitudinal axis Z of the torch are designed to receive screws that press against the tubes 33, 35 and 37 that form the torch 30. In particular, with reference to FIG. 12, the threaded holes (not shown) of tube clamp 34 house an array of three screws 90 and an array of three screws 91, with each screw that is spaced of 120° from each adjacent screw of the same array, and that is perpendicular to the longitudinal axis Z of the inner tube 33, and of the torch 30.

In the same way as described for tube clamp 34, also the threaded holes 82, 83 and 84, 85 of the other tube clamps 36 and 38, respectively, receive corresponding screws that press against the intermediate tube 35 and the outer tube 37.

According to embodiments not shown of the apparatus of the invention, there can be only one array of threaded holes with corresponding screws, or more than two arrays of threaded holes with corresponding screws.

According to other embodiments not shown of the apparatus of the invention, there can be more than three threaded holes with corresponding screws for each array of holes, for example four holes and four screws.

The screws provided in each tube clamp, 34, 36 and 38 are means for fixing the tubes 33, 35 and 37 to each clamp, respectively, and to allow centering the tubes to ensure that they are mounted coaxially along the longitudinal axis Z of the torch 30.

It is to be noted that this structure of the torch allows a total assembling and disassembling of each component of the upstream section 30.1 of the torch, as shown in FIGS. 5 to 8. This structure allows to check each component and, if necessary, to replace it without replacing the entire section of the torch.

The hollow cylindrical spacer 48 is also provided with a lower flange 47, also provided with holes 49 for fixing to a hollow body 50, belonging to the intermediate section 30.2 of the torch 30. The hollow cylindrical spacer 48 is therefore removably fixed to the hollow body 50 and to the tube clamp 48, belonging to the fixing and centering means of the tubes 33, 35 and 37, just as the tubes 33, 35 and 37 are removably fixed.

The hollow body 50 has an approximately parallelepiped shape and has a cavity 52, also parallelepiped shaped, in which there are defined an upstream surface 54, or upstream side or upper surface, and a downstream surface 56, or downstream side or lower surface, provided with respective circular holes 55 and 57 passing through the upstream side 74 and the downstream side 76 of the body 50, for housing the outer tube 37 of the torch 30 (FIG. 5). The upper surface 54 is flat and is perpendicular to the axis Z of the torch 30. The cavity 52 preferably has the internal dimensions of the waveguide of the system, i.e. of isolator 22, 3-stub tuner 24 and window 26, if present.

In the present description, with reference to the hollow body 50, the term "upstream side" or "upstream surface" or "upper surface" are used without distinction, just as the term "downstream side" or "downstream surface" or "lower surface" are used without distinction. The hollow body 50 also has a side 53 provided with a square opening to which the quartz window 26, suitable for passage of the microwaves MW inside of the cavity 52, is applied. The hollow body 50 also has a side 59, opposite the side 53, also provided with a square opening on which the short circuit terminal 28 is placed.

The downstream section 30.3 of the torch 30 comprises a sleeve 60 provided with an upper flange 62 and a lower flange 64. The sleeve 60 is fixed to the hollow body 50 by means of the upper flange 62 by means of screws (not illustrated) engaged in holes 63 of the flange and corresponding threaded holes (not illustrated) of the hollow body 50.

In the embodiment illustrated a lower tube clamp 66 with flange 68 is fixed to the base of the sleeve 60 by means of screws (not illustrated) engaged in holes 67 of the lower flange 64 of the sleeve 60 and corresponding holes 69 of the flange 68 of the tube clamp 66.

The sleeve 60 is thus removable fixed to the hollow body 50 and to the tube clamp 66.

Traction springs (not illustrated) are housed on the flange 68, so as to guarantee a constant upward pressure of the tube 37', and therefore the seal of the joint with the outer tube 37, and at the same time freedom for axial expansion caused by heating of this tube.

In the embodiment illustrated, the outer tube 37, fixed and centered by the tube clamp 38, is divided into an upper part—designated with the reference numeral 37—which extends up to the lower limit of the hollow body 50, at the lower limit of the central section 30.2 of the torch 30, and a lower part, designated as extension tube 37'.

The tube clamp 38 is formed with a cylindrical axial hole for insertion of the outer tube 37 and with a seat 31 for housing a sealing gasket. The tube clamp 38 is also provided with a hole 32 for the tangential input of a cooling gas, or shielding gas, as will be described below.

The base of the outer tube 37 rests on the extension tube 37', with outer and inner diameter identical to the outer tube 37, which is housed in the sleeve 60 of the torch and is connected at the bottom to the tube clamp 66. A protective bushing 39 is housed in a seat produced in the lower part of the body 50 and in the upper part of the sleeve 60, at the contact surface of the outer tube 37 with the extension tube 37'.

In an embodiment, not illustrated, the tube 37 is not divided into two parts but extends into the lower section 30.3 of the torch at the base of the sleeve 60 and at the protective bushing 39, like the extension tube 37'.

The protective bushing 39 is a short segment of tube, outside the outer tube 37, which provides thermal and electrical protection of the metal parts for the outer tube 37 and the extension tube 37', at their joint. It is a cylindrical bushing, with uniform wall thickness, with both ends open.

A plasma containment chamber 51 is defined inside the outer tube 37, at the cavity 52 of the hollow body 50. In fact, this is the portion of outer tube hit by the microwaves and in which the plasma forms, introduced into this chamber by means of the intermediate tube 35.

The circular holes 55, 57 of the hollow body 50 are coaxial with the longitudinal axis Z of the torch 30, and have a diameter smaller than the dimension of the upstream 74 and downstream 76 sides of the hollow body 50. The axis Z of these holes is perpendicular to the axis X of the waveguide 20, hence to the direction MW of the microwaves. The hollow body 50 is provided with a system of through holes 58 for the circulation of a coolant.

The intermediate tube 35, the upstream end of which is fixed to the tube clamp 36, extends for a distance inside the cavity 52 of the hollow body, as will be described in more detail below.

The inner tube 33, the upstream end of which is fixed to the tube clamp 34, does not extend inside the cavity 52 of the hollow body but ends upstream of the downstream end of the intermediate tube 35, as will be described in more detail below.

In the extension tube 37' of the downstream section 30.3 of the torch 30 there is defined a secondary treatment zone of the material to be treated, ending with an exhaust opening.

As described for the upstream section 30.1 of the torch, also the central section 30.2 and the downstream section 30.3 are made of components that can be assembled and disassembled to be checked and, if necessary, replaced without replacing the entire sections of the torch, thanks also to the fastening and centering means, as described above. An example of the steps required to assemble the components of the torch 30 is described below.

1. The metal parts of the torch are assembled (pieces 34-36-38-48).
2. Insertion of the inner tube 33 into its seat in the tube clamp 34. The support and alignment screws 90, 91 are adjusted to make the end of tube 33 concentric with the inside of the hollow cylindrical spacer 48. This can be done by measuring the distance on three or more points of the circumference or using a suitably sized alignment tool.
3. Insertion of the intermediate tube 35 into its seat in the tube clamp 36. Then the support and alignment screws received in holes 82,83 are adjusted to make the end of the tube 35 concentric with the inside of the hollow cylindrical spacer 48. This can be done by measuring the distance on three or more points of the circumference or using a suitably sized alignment tool.
4. Insertion of the outer tube 37 into its seat in the tube clamp 38. Then the support and alignment screws received in holes 84,85 are adjusted to make the end of the tube 37 concentric with the inside of the hollow cylindrical spacer 48. This can be done by measuring the distance on three or more points of the circumference or using a suitably sized alignment tool.
5. As a further finishing step it is possible to act on the support and alignment screws to correct the overall alignment, where necessary.

Figure 11:
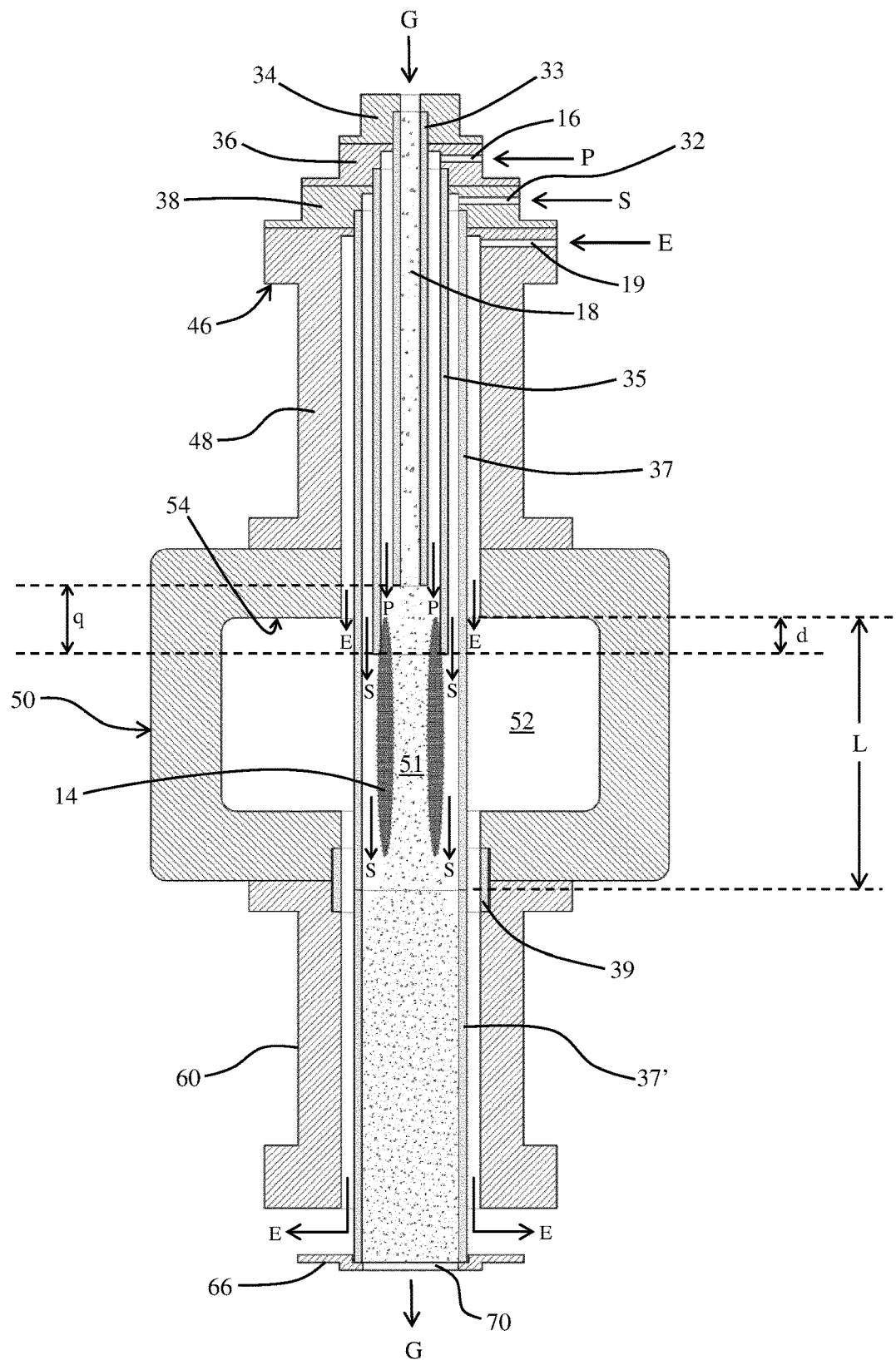
FIG. 11 is a schematic sectional view of the torch of FIG. 4.

FIG. 11 provides a schematic view of the torch 30 and of its operation.

With regard to the operation of the torch 30, the material to be treated 18 is introduced into the inner tube 33 from the upstream end, together with an injection gas, according to the arrow G, while the gas destined to form the plasma (arrow P) is introduced into the intermediate tube 35 through a hole 16 of the tube clamp 36, hence according to a tangential direction. The gas flows downward through the gap between intermediate tube 35 and inner tube 33 and passes through the plasma containment chamber 51. In chamber 51 the gas is hit by the microwaves and, as a result of the electromagnetic field of the microwaves, is ionized to form plasma. The material discharged from the inner tube 33 therefore passes through the plasma chamber and is subjected to the treatment thereby. Both the material and the gas then pass through the extension tube 37' in the downstream section 30.3 and are discharged from the hole 70.

By means of the hole 32 of the tube clamp 38 a shielding gas (arrow S) is introduced and flows downward through the gap between the outer tube 37 and the intermediate tube 35, forming a thermal protection of the outer tube 37.

Finally, by means of a hole 19 made in the flange 46 of the spacer 48, an external gas (arrow E) is introduced, which flows through the gap between the outer tube 37 and the spacer 48 until reaching the cavity 52, with the purpose of providing thermal protection for the outer tube 37 from the outside. The external gas E is then ejected by means of the gap between the extension tube 37' and the sleeve 60, which performs the function of protecting the tube 37' and preventing propagation of the microwaves to the outside.

According to an aspect of the present invention, the torch is as large as possible, in order to be able to process as much material as possible, of course without compromising the quality of the process.

The only dimensional limit is the one related to the microwave leakage from the waveguide 20 through the torch 30. There is leakage of microwaves from the waveguide 20 through the torch 30 if the circular holes 55 and 57 passing through the upstream side 74 and the downstream side 76 of the body 50, for housing the outer tube 37 of the torch 30 (FIG. 5) are configured as a propagating waveguide.

The formula below defines the maximum size of the hole in the body 50, i.e. the maximum external diameter of the outer tube 37 (Dmax), to avoid propagation of microwaves out of the system:

$$D\max = 0.586 \cdot \lambda_{vacuum},$$

wherein $\lambda_{vacuum}$ is the wavelength of the microwaves in vacuum.

In the apparatus of the invention also the minimum external diameter (Dmin) of the outer tube 37 depends on the wavelength of the microwaves in vacuum, according to the following relation:

$$D\min = 0.15 \cdot \kappa_{vacuum}.$$

The two relations above can be expressed as a single relation:

$$0.586 > \frac{D_{outer}^{ext}}{\lambda} \geq 0.15$$

It is thus also possible to define the size of the outer tube 37 as a function of the maximum and minimum frequency preferred for microwaves for the apparatus of the present invention, which, as already stated above, are of 6,000 and 400 MHz, respectively.

The range of diameters D for the maximum frequency (fmax) and for the lowest frequency (fmin) is given below:
 fmax=6000 MHz 8 mm<D<29 mm
 fmin=400 MHz 112 mm<D<439 mm For the two most common frequencies in industrial use of microwaves this relationship leads to:

$D$max for frequency of 2450 MHz=0.586·122.4 mm=72 mm $D$min, for frequency of 2450 MHz=0.15·122.4 mm=18 mm $D$max, for frequency of 915 MHz=0.586·327.6 mm=192 mm $D$min, for frequency of 915 MHz=0.15·327.6 mm=50 mm wherein:
 122.4 mm and 327.6 mm are the wavelengths corresponding to the frequencies of 2450 and 915 MHz, respectively; and
 the values are rounded to 1 mm.

According to an aspect of the present invention the diameters of the outer 37, intermediate 35 and inner 33 tubes satisfy the following relations:

$$0.85 \geq \frac{D_{outer}^{int}}{D_{intermediate}^{ext}} \geq 0.5$$

$$0.85 \geq \frac{D_{intermediate}^{int}}{D_{inner}^{ext}} \geq 0.5$$

where:
 $\lambda$ is the wavelength in vacuum of the microwaves at the frequency of the system in use;
 the superscript indicates whether this is the outer or inner diameter of the tube; and
 the subscript indicates the tube being referred to, i.e., the outer tube (37), the intermediate tube (35) or the inner tube (33).

By means of these relations, starting from the dimension of the outer tube 37, it is possible to identify an acceptability range of the diameters of the tubes. The thickness of the tubes must be chosen so as to balance costs, strength and occupation of space.

According to an aspect of the invention, the downstream ends of the inner tube 33 and intermediate tube 35 satisfy one of the following alternative conditions:
 i. the downstream end of the intermediate tube 35 is aligned with the upstream surface 54 of the cavity 52 of the hollow body 50; or
 ii. the downstream end of the intermediate tube 35 extends for a distance beyond this surface 54 inside the cavity 52, as represented in FIGS. 4 and 11.

With regard to the inner tube 33, its downstream end is aligned with the downstream end of the intermediate tube 35, or is arranged upstream of the downstream end of the intermediate tube 35. In any case, the inner tube 33 does not protrude beyond the intermediate tube 35. Therefore, a distance "q" is defined between the downstream end of the tube 33 and the downstream end of the tube 35 by means of the following relation:

$$0 \leq q \leq 0.3 \cdot \lambda$$

where $\lambda$ is the wavelength in vacuum at the frequency of the system in use.

According to an aspect of the invention, the conditions i) and ii) can be further defined with a relation referred to the distanced of the downstream end of the intermediate tube 35 with respect to the upper surface 54 of the cavity 52 of the hollow body 50:

$$0 \leq d \leq 0.2 \cdot \lambda$$

where $\lambda$ is the wavelength in vacuum at the frequency of the system in use.

Moreover, in the embodiment in which the outer tube 37 is divided into two parts and comprises a lower extension tube 37', the distance L of the downstream end of the outer tube 37 with respect to the upper surface 54 of the cavity 52 of the hollow body 50 satisfies the following relation $$L \geq 0.35 \cdot \lambda$$

where $\lambda$ is the wavelength in vacuum at the frequency of the system in use.

In this way the absolute length of the tubes depends only on the length of the spacer 48, which depends on thermal factors and on effective containment of the microwaves and which can thus be chosen by a person skilled in the art, as a function of the operating frequency of the system.

The diameters and lengths indicated in the aforesaid relations are expressed in millimeters.

With reference to FIGS. 1-3, the short circuit terminal 28 is such that superimposition of the forward and the reflected wave is at its maximum in the area located at the axis of the torch 30, hence at the distance n·λ/4 from the bottom of the terminal 28, where n are the positive odd integers and λ is the wavelength in the waveguide.

The components defined as tube clamp, spacer and sleeve, with the exception of the tube clamp 66, are made of a material that offers the correct compromise of machinability, lightness, electrical conduction and mechanical strength. Examples of suitable materials are aluminum and its commercially available alloys.

The lower tube clamp 66 is instead made of a material capable of withstanding high temperatures and corrosion. An example of material suitable for the purpose, relatively inexpensive and machinable, is AISI 316 stainless steel. However, it is possible to imagine the use of other materials, such as other stainless steels, ceramic materials or non-ferrous alloys.

The tubes 37, 35 and 33 of the torch 30, also shown in FIGS. 6-9, are dielectric and perform the following functions.

The outer tube 37 produces the gap with the spacer 48 in which the external gas flows. Toward the inside, it produces the gap with the intermediate tube, in which the shielding gas flows.

As stated previously, the outer tube can optionally be segmented into an upper part 37, fixed and aligned by the related tube clamp 38, and a lower part 37', free and maintained in contact with the upper part 37 through the support 66, described previously. It is a cylindrical tube, with uniform wall thickness, with both ends open.

The intermediate tube 35 produces toward the outside the gap with the outer tube 37, in which the external gas flows. Toward the inside, it produces the gap with the inner tube 33 in which the plasma gas flows. It is a cylindrical tube, with uniform wall thickness, open at both ends.

The inner tube 33, produces, toward the outside, the gap with the intermediate tube 35 in which the plasma gas flows. An injection gas, mixed with the solid or gaseous material to be treated, flows inside the tube 33. It is a cylindrical tube, with uniform wall thickness, open at both ends. All the tubes described above, and the sleeve 39 (FIG. 10) are made of material that complies with the characteristics of transparency to microwaves, resistance to heat (up to at least 1800° C.), high dielectricity (necessary to contain the plasma), mechanical strength and limited costs. An example of material with similar and preferable characteristics with respect to others is alumina or aluminum oxide ($Al_2O_3$). However, it would be possible to use other suitable materials to produce the tubes, such as, by way of non-limiting example, quartz, zirconium oxide or boron nitride.

An important application of the apparatus according to the invention relates to the process for treating materials with plasma, in particular for treating powder materials, more in particular for treating intercalated graphite.

The process is advantageously implemented using the apparatus described above, the dimensional and material characteristics of which are able to allow, in the right conditions, ignition and stable sustaining of a microwave-induced plasma with characteristics suitable for industrial use.

In a preferred embodiment of the process a plasma is generated at a pressure just above atmospheric pressure, in order to compensate for the limited pressure drop to which the gas flow is subjected when exiting from the tubes, and any other pressure drops in collection structures downstream of the torch, until reaching the atmosphere. Therefore, the temperature of the plasma is high. Different ionized gases produce different temperatures. In the case of argon and in the conditions indicated, the maximum temperature of the plasma is equal to around 6000 K.

The material to be treated, for example ground and intercalated natural graphite, is introduced axially into the torch 30, according to the direction of the arrow G (FIGS. 3, 4, 11), and mixed with an injection gas, in the upstream section 30.1 of the torch.

The actual plasma, i.e., the region of high temperature ionized gas, exists as a region more or less tubular in shape, very thin and with a diameter more or less equal to that of the plasma tube, as represented with 14 in FIG. 11. The microwaves have poor penetration capacity through a conductive region, such as plasma, and therefore only energize the outer layer of this region.

The region of the outer tube 37 in which the plasma 14 is formed is defined as plasma containment chamber 51.

The plasma 14 starts, upstream, approximately at the end of the intermediate tube 35, also called "plasma tube", which extends inside the cavity 52 of the hollow body 50 for a distance d, which can be 0 or no greater than 0.2λ, as defined above. The plasma 14 ends, downward, in a tapered region inside the plasma containment chamber 51, sometimes called "plume", which can extend inside the sleeve 60 and even reach the base thereof. For this reason, the region inside the extension tube 37', downstream of the plasma containment chamber 51, is defined secondary treatment zone, as the presence of any plasma can perform a secondary treatment of the material G. Therefore, it must be understood that the definition of the chamber 51 as plasma containment chamber should not be understood as absolute plasma confinement chamber.

It must be specified that the electromagnetic field that sustains the plasma is only present in the window defined by the waveguide 24: recombination of ions and electrons takes place rapidly in the zone immediately downstream, so that the region of the plume is a region of high temperature gas and only partially of actual plasma.

The material to be treated passes through the cylindrical region inside the plasma, but not in direct contact therewith due to the poor penetration of the microwaves, where it receives a strong thermal pulse, mainly by irradiation. In the case of intercalated graphite, this is the phase in which expansion starts. In this phase the material is surrounded exclusively by noble gas and therefore is protected from oxidation.

In the case of intercalated graphite, expansion continues for the entire fall of the material, hence also outside the area of maximum irradiation provided by the plasma, therefore also in the secondary treatment zone, until the temperature is greater than approximately 300° C.

Immediately after the plasma zone, the expanded material passes through the plume zone. It should be noted that the flow of shielding gas S, for example air, introduced tangentially into the outer tube 37, produces a thermal protection of the outer tube. The temperature profile along the axis and along the diameter of this tube 37 is not known with precision, but it is certain that in this region there are areas in which the temperature exceeds 400-450° C. and oxygen is present: therefore, a combustion rate also occurs in this region, however without the quality of the material being significantly influenced.

With regard to the gas flows employed in the torch 30, a gas current with a specific function is introduced tangentially into each gap between one ceramic tube and the next.

The injection gas, introduced axially into the inner tube 33, has the purpose of conveying and fluidifying the flow rate of material to be treated, for example intercalated graphite, that passes through the plasma. The injection gas has an important influence in determining the quality of the material treated, affecting the residence time. Too high a flow rate reduces the residence time at high temperatures, reducing the efficacy of the treatment, and, in the case of intercalated graphite, increasing the apparent density of the expanded material, while too low a flow rate can increase the residence time excessively, which in the case of intercalated graphite causes sublimation or combustion of the graphite. The injection gas must be an inert gas, possibly the same used for the plasma so as not to interfere with sustaining of this plasma.

The plasma gas P, introduced tangentially into the intermediate tube 35, is the "fuel" for sustaining the plasma. With the same forward power, it is possible to identify a minimum reflected power point varying the flow rate of plasma gas: below this point the plasma gas is insufficient to guarantee correct propagation of ionization, while above this point the "shift" effect of the plume prevails, which tends to be extinguished. It must be an inert gas, for example nitrogen, argon, helium or the like.

The shielding gas S, introduced tangentially into the outer tube 37, flows between the intermediate tube 35 and the outer tube 37. It has the dual purpose of cooling the plasma tube externally and of shielding the upper and lower outer tube from the impact of the hot gases and of the expanded graphite delivered from the intermediate tube 35. The shielding gas S cannot be a gas that is easily ionizable at approximately atmospheric pressure, otherwise the plasma is transferred into this tube from the inner tube. Although an excellent gas mixture for this purpose is normal compressed air, this is not the only possible gas. As it contains oxygen, the shielding air causes the combustion of a minimum fraction of the material to be treated, if this is combustible, in the case of graphite this takes place at the exit from the argon protective zone and with a temperature greater than 400-450° C.

The purpose of the external gas E, introduced tangentially into the spacer 48 through the hole 19, is to promote cooling of the plasma source on the outside of the outer tube 37, also maintaining the source slightly pressurized with respect to the outside and hence preventing dirt and conductive particles from entering the source. It does not participate in expansion of the graphite.

It is possible to express the flow rates of the gases as equivalent velocities referred to the section of the annulus into which the gases are injected:

$v_{external} > 0$ m/s $v_{shielding} \geq 0.5$ m/s $v_{plasma} \geq 0.5$ m/s $v_{injection} \geq 0.1$ m/s where $v_{external}$ is the velocity of the external gas, $v_{shielding}$ is the velocity of the shielding gas, $v_{plasma}$ is the velocity of the plasma gas and $v_{injection}$ is the velocity of the injection gas. Another functional parameter of the process is the power of the microwave signal, and is highly dependent on the expected result of the treatment. Although the torch with the dimensions described which operates with gas flows as described can sustain a plasma below 1 kW of power, the object of the invention is to produce an industrial process with high productivity.

A device with the dimensions as described is able to operate stably and for long periods of time without requiring maintenance, with a power that, in relation to the dimension of the torch, can be indicated as:

$$\frac{FP}{S_{plasma}} \leq 45 \text{ W/mm}^2$$

where FP is the "forward" power of the microwave generator associated with the torch, expressed in kW and $S_{plasma}$ indicates the area of the annulus of the plasma tube section, expressed in mm².

With regard to the treatment capacity of the intercalated graphite, a torch with the dimensions described and which is operated with gas flows and microwave power in the limits indicated is able to treat large quantities of material with high quality of the product delivered.

High quality is meant, in the case of graphite, as an apparent density of no more than 3 g/dm³, preferably no more than 2.5 g/dm³, where the initial intercalated graphite has apparent densities in the order of 610 g/dm³. In these conditions the maximum productivity or, in other words, the maximum treatment capacity of intercalated graphite, referred to the microwave power of the system can be expressed by the relation:

$$\frac{G}{FP} \leq 1,5 \text{ g/W}_h$$

where G is the productivity, expressed in g/h of expanded material, FP is the "forward" power of the generator, expressed in kW and g are the grams of the unit of measurement.

With respect to prior art apparatus and processes, it has been found that the apparatus according to the present invention can be used for the industrial treatment of powder materials, in particular and preferably intercalated graphite in order to obtain expanded graphite.

The apparatus described does not require only quartz tubes, although it accepts them, but is adaptable to other materials with suitable characteristics, such as and preferably aluminum oxide, zirconium oxide or boron nitride. The tubes used are simple dielectric tubes, cylindrical in shape and with a constant section.

Moreover, the microwave torch is provided with means for centering the tubes with respect to one another and with respect to the axis of the torch, so as to guarantee alignment with the point of maximum intensity of the electromagnetic field inside the waveguide. Therefore, ceramic tubes produced with extreme precision are not required, industrial grade tubes being sufficient with regard to linearity tolerances. The same applies for the dimensional tolerance on the diameters: the use of an elastic sealing means, such as O-rings, between the tube and its tube clamp, in combination with the alignment and centering system, makes it possible to accept tubes with dimensional tolerances on the diameter of industrial type.

The apparatus produced with the dimensional parameters indicated can be adapted to microwave systems of any frequency, in particular and preferably for the two most widely used systems at 2450 MHz and 915 MHz.

From a functional viewpoint, with regard to the generation of plasma and its use, the use of an industrial microwave torch is an improvement with respect to an ICP type torch.

In fact, in an ICP system the plasma is by definition tightly coupled with the electronic circuit that sustains it. On the one hand, this makes it possible to act actively on the plasma by regulating the generation system, potentially making the process more efficient, while on the other it causes a plasma feedback effect on this generation system. This may not be a disadvantage in analysis apparatus such as spectroscopy systems, where small samples are vaporized in plasma to be analyzed, but instead is damaging in industrial systems for treating electrically conductive materials, which can interact with the plasma and hence create interference to the generation system.

In a microwave system such as the one described, the generation system is isolated from the applicator, i.e., the torch, and therefore does not undergo any feedback, making it more reliable and stable. Moreover, the generator does not require calibration or specific modifications.

Microwave generators are widely used in industry and therefore more widespread on the market, highly scalable, easily adjustable and interchangeable.

Due to what has been described above, and to the physical separation produced with the isolation window, it is highly unlikely that breakages in a microwave torch will lead to problems with the generator. Moreover, replacing a structured microwave torch such as the one described is faster and simpler than replacing an induction torch, where it is necessary to take action not only on the mechanical components (tubes, arc protection elements) but also on the inductive coupling loops, which are liquid cooled, making the operation more laborious.

An example of embodiment of the process for treating intercalated graphite with the apparatus according to the present invention is provided below.

EXAMPLE

A commercially available expandable intercalated graphite (grade ES 250 F5 sold by Graphit Kropfmühl AG) is treated at the flow rate of 5 kg/h in an apparatus having a torch complying with the characteristics described and illustrated in FIGS. 1-11, dimensioned for waveguide WR975—system operating at 915 MHz. The expanded material is collected for qualitative analysis immediately downstream of the torch.

The torch used had tubes with the following dimensions:

| | |
|---|---|
| Tube 33 (Injector) | outer diameter 20 |
| | inner diameter 15 mm |
| | length 420 mm |
| Tube 35 (plasma) | outer diameter 38 |
| | inner diameter 30 mm |
| | length 370 mm |
| Tube 37 (outer) | outer diameter 60 mm |
| | inner diameter 50 mm |
| | length 450 mm |
| Sleeve 60 | outer diameter 60 mm |
| | inner diameter 50 mm |
| | length 230 mm |
| Spacer 48 | outer diameter 80 mm |
| | inner diameter 68 mm |
| | length 40 mm |

The distances (d) and (L) of the intermediate tube 35 (plasma) with respect to the upper surface 54 of the cavity 52 of the hollow body 50 were as follows:

d=7.65 mm, which satisfies the relation $$0 \leq d \leq 0.2 \cdot \lambda \ \{0 < 7.56 \text{ mm} < 65.5 \text{ mm}\}$$

L=159.56 mm, which satisfies the relation $$L \geq 0.35 \cdot \lambda \ \{159.56 \text{ mm} > 114.7 \text{ mm}\}$$

where $\lambda = \{327.6 \text{ mm}\}$

The distance (q) between the downstream end of the tube 33 (injection) and the downstream end of the tube 35 (plasma) was 17 mm, which satisfied the relation:

$$q = 17 \text{ mm where } 0 < q < 98.3 \text{ mm}$$

The tubes were made of high purity aluminum oxide/alumina (99.5%).

Process Parameters:
Injection gas: 4 slpm/Argon 5.5
Plasma gas: 27 slpm/Argon 5.5
Shielding gas: 120 slpm/Compressed air
where slpm=standard liters per minute—25° C. and 1 bar
External gas: 50 slpm/Compressed air
Forward power of the generator: 6.5 kW
Expanded material apparent density: ~2.5 g/dm$^3$ It was thus possible to obtain a maximum productivity of over 6 kg/h (equal to 100 g/minute).

In these conditions all the basic requirements of the system are obtained: stability and compliance with the quality parameters of the expanded material.

The invention claimed is:
1. An apparatus for treating materials with plasma, comprising:
   a microwave generator;
   a waveguide; and
   a tubular torch comprising an upstream section, a central section, a downstream section, and at least one inner tube, an intermediate tube, and an outer tube arranged coaxially, each having an upstream end and a downstream end,
   wherein said outer tube extending from said upstream section at least up to said central section of said torch and defines a plasma containment chamber in said central section of the torch;
   wherein the longitudinal axis of said torch is aligned with the electric field operatively generated in said waveguide;
   wherein said inner tube, said intermediate tube, and said outer tube of said torch are removably mounted at their upstream ends via fixing and centering means in said upstream section of said torch;
   wherein said waveguide is connected to said microwave generator and to a hollow body of said central section of the torch, said hollow body having a cavity in which there are defined an upstream side and a downstream side, each provided with a circular hole for housing said outer tube of the torch, said plasma containment chamber being defined in the outer tube;
   wherein the downstream end of said intermediate tube is aligned with said upstream side of said cavity of said hollow body, or extends for a portion beyond said side upstream side of said cavity;
   wherein the downstream end of said inner tube is aligned with the downstream end of said intermediate tube, or is arranged upstream of the downstream end of said intermediate tube;

wherein said downstream section of said torch comprises a secondary treatment zone defined in said outer tube downstream of said plasma containment chamber, ending with an exhaust opening.

2. The apparatus of claim 1, wherein said material to be treated is operatively introduced into said inner tube and said plasma is formed in said plasma containment chamber from a gas introduced into said intermediate tube and subjected to electromagnetic field generated by the microwave generator.

3. The apparatus of claim 1, wherein said fixing and centering means of said tubes comprise a tube clamp for said inner tube, a tube clamp for said intermediate tube and a tube clamp for said outer tube, mounted one on top of the other in said upstream section of said torch by respective flanges.

4. The apparatus of claim 3, wherein each of said tube clamps is provided with threaded holes perpendicular to the longitudinal axis Z of said torch, adapted to receive corresponding screws that press against said inner tube, said intermediate tube and said outer tube, respectively.

5. The apparatus of claim 3, wherein each of said tube clamps is provided with one or more array of at least three threaded holes perpendicular to the longitudinal axis Z of said torch, adapted to receive corresponding screws that press against said inner tube, said intermediate tube and said outer tube, respectively.

6. The apparatus of claim 5, wherein each of said tube clamps is provided with two arrays of three threaded holes, each hole of each array being spaced 120° from each other.

7. The apparatus of claim 1, wherein said upstream section of said torch comprises a hollow cylindrical spacer arranged between said fixing and centering means of said tubes and said hollow body belonging to the intermediate section of said torch, said spacer being removably fixed to said fixing and centering means and said hollow body.

8. The apparatus of claim 1, wherein said hollow body has a parallelepiped shape and said cavity has a parallelepiped shape, and that said upstream side of said cavity comprises a flat surface perpendicular to said longitudinal axis of said torch.

9. The apparatus of claim 1, wherein said downstream section of said torch comprises a sleeve removably fixed to said hollow body and to a lower tube clamp, provided with a discharge hole for said material to be treated.

10. The apparatus of claim 1, wherein said downstream end of said intermediate tube is aligned with said upstream side of said cavity of said hollow body.

11. The apparatus of claim 1, wherein said downstream end of said intermediate tube extends for a distance beyond said upstream side of said cavity, said distance being defined by the following relation:

$$0 \le d \le 0.2 = \lambda$$

where $\lambda$ is a wavelength in vacuum of generated microwaves at a frequency in use.

12. The apparatus of claim 1, wherein said downstream end of said inner tube is aligned with the downstream end of said intermediate tube.

13. The apparatus of claim 1, wherein said downstream end of said inner tube is arranged upstream of the end downstream of said intermediate tube for a distance (q) defined by the following relation:

$$0 \le q \le 0.3 \times \lambda$$

where $\lambda$ is a wavelength in vacuum of generated microwaves at a frequency in use.

14. The apparatus of claim 1, wherein the diameters of said outer, intermediate, and inner tubes satisfy the following relations:

$$0.586 > \frac{D_{outer}^{ext}}{\lambda} \ge 0.15$$

$$0.85 \ge \frac{D_{outer}^{int}}{D_{intermediate}^{ext}} \ge 0.5$$

$$0.85 \ge \frac{D_{intermediate}^{int}}{D_{inner}^{ext}} \ge 0.5$$

where $\lambda$ is a wavelength in vacuum of generated microwaves at a frequency in use.

15. The apparatus of claim 1, wherein said outer tube does not extend into said downstream section of said torch, and the downstream end of said outer tube is spaced apart from said upstream side of said cavity of said hollow body, wherein said distance satisfies the following relation:

$$L > 0.35 \times \lambda$$

where $\lambda$ is a wavelength in vacuum of generated microwaves at a frequency in use.

16. The apparatus of claim 1, wherein said outer tube extends into said upstream section of said torch.

17. A method for treating materials with plasma using an apparatus according to claim 1, the method comprising:
 operatively introducing the material to be treated into the inner tube; and
 forming the plasma in the plasma containment chamber from a gas introduced into the intermediate tube and subjected to electromagnetic field generated by the microwave generator.

18. The method of claim 17, wherein the material to be treated comprises intercalated graphite.

* * * * *